United States Patent
Ishizu (10) Patent No.: US 10,108,378 B2
(45) Date of Patent: Oct. 23, 2018

(54) REMOTE MAINTENANCE SYSTEM

(71) Applicant: KYOCERA DOCUMENT SOLUTIONS INC., Osaka (JP)

(72) Inventor: Ryuichi Ishizu, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/686,134

(22) Filed: Aug. 24, 2017

(65) Prior Publication Data

US 2018/0059996 A1    Mar. 1, 2018

(30) Foreign Application Priority Data

Aug. 26, 2016  (JP) .................................. 2016-165318

(51) Int. Cl.
| | |
|---|---|
| *G03G 15/00* | (2006.01) |
| *G06F 13/00* | (2006.01) |
| *G06F 3/12* | (2006.01) |

(52) U.S. Cl.
CPC ....... *G06F 3/1203* (2013.01); *G03G 15/5083* (2013.01); *G06F 3/1235* (2013.01); *G03G 15/55* (2013.01); *G03G 2215/00113* (2013.01); *G06F 3/121* (2013.01); *G06F 3/1288* (2013.01)

(58) Field of Classification Search
CPC .......... G03G 15/5075; G03G 15/5079; G03G 15/5083; G03G 15/55; G03G 2215/00109; G03G 2215/00113; G06F 3/1203; G06F 3/1235; G06F 3/121; G06F 3/1288
See application file for complete search history.

(56) References Cited

U.S. PATENT DOCUMENTS

| | | | |
|---|---|---|---|
| 8,488,161 B2* | 7/2013 | Sunata | G06F 3/1203 358/1.15 |
| 9,036,191 B2* | 5/2015 | Kikumoto | G06F 3/1288 358/1.14 |
| 2007/0258723 A1* | 11/2007 | Nakazato | G03G 15/55 399/9 |
| 2007/0288423 A1 | 12/2007 | Kimoto | |
| 2010/0080572 A1* | 4/2010 | Tsuzuki | G03G 15/5075 399/10 |

FOREIGN PATENT DOCUMENTS

JP    2007-334471 A    12/2007

* cited by examiner

*Primary Examiner* — Sophia S Chen
(74) *Attorney, Agent, or Firm* — Li & Cai Intellectual Property (USA) Office (57) ABSTRACT

A remote maintenance system includes: one or more image forming apparatuses; a server; and a terminal, the one or more image forming apparatuses each notify, when the image forming apparatus itself executes printing, the server of print information, the print information at least including print start time, print end time, and the number of printed sheets, the server stores, when being notified of the print information, the print information in a management database, analyzes a usage status of the one or more image forming apparatuses based on the print information, and stores the analysis result in the management database, and acquires the analysis result of the usage status of the image forming apparatus to be maintained at the time of scheduled maintenance and failure of any of the one or more image forming apparatuses, attaches the analysis result to the notification, and sends the notification to the terminal.

4 Claims, 5 Drawing Sheets

REMOTE MAINTENANCE SYSTEM

CROSS REFERENCE TO RELATED APPLICATION

This application claims the benefit of Japanese Priority Patent Application JP 2016-165318 filed Aug. 26, 2016, the entire contents of which are incorporated herein by reference.

BACKGROUND OF THE INVENTION

1. Field of the Invention

The present disclosure relates to a remote maintenance system and a remote maintenance method that remotely maintain an image forming apparatus (MFP, Multifunction Peripheral).

2. Description of Related Art

In remote maintenance by a remote maintenance system, maintenance is performed according to the usage status of an image forming apparatus by a customer.

It is desirable to provide a remote maintenance system and a remote maintenance method capable of making use of information on idle time when a user does not use the image forming apparatus even in on-site maintenance.

SUMMARY OF THE INVENTION

A remote maintenance system according to an embodiment of the present disclosure include one or more image forming apparatuses; a server; and a terminal, in which the one or more image forming apparatuses each include a first communication device capable of communicating with the server via a network, a first memory that stores a first information processing program, and a first processor that executes the first information processing program, when the first processor executes the first information processing program, the first processor notifies, when the image forming apparatus itself executes printing, the server of print information, the print information at least including print start time, print end time, and the number of printed sheets, the server includes a second communication device capable of communicating with the one or more image forming apparatuses and the terminal via the network, a second memory that stores a second information processing program, a third memory that stores a management database that stores the print information notified from the one or more image forming apparatuses, group definition information, which image forming apparatus belongs to which group being defined in the group definition information, and notification setting, a destination for sending a notification to the terminal being set in the notification setting, and a second processor that executes the second information processing program, and when the second processor executes the second information processing program, the second processor stores, when being notified of the print information from each of the one or more image forming apparatuses, the notified print information in the management database, analyzes a usage status of the one or more image forming apparatuses based on the print information stored in the management database, and stores the analysis result in the management database, and acquires, from the management database, the analysis result of the usage status of the image forming apparatus to be maintained at the time of scheduled maintenance and failure of any of the one or more image forming apparatuses, attaches the acquired analysis result to the notification, and sends the notification to the terminal.

With this configuration, it is possible to make use of information on idle time when a user does not use the image forming apparatus even in on-site maintenance.

A remote maintenance method according to an embodiment of the present disclosure is a remote maintenance method for a remote maintenance system including a server, one or more image forming apparatuses, and a terminal connected to a network, the remote maintenance method including: notifying, by each of the one or more image forming apparatuses, the server of print information, the print information at least including print start time, print end time, and the number of printed sheets when the image forming apparatus itself executes printing; storing, by the server, the notified print information in a management database when the print information is notified from each of the one or more image forming apparatuses; analyzing, by the server, a usage status of the one or more image forming apparatuses based on the print information stored in the management database, and storing the analysis result in the management database; and acquiring, by the server, the analysis result of the usage status of the image forming apparatus to be maintained at the time of scheduled maintenance and failure of any of the one or more image forming apparatuses from the management database, attaching the analysis result to the notification, and sending the notification to the terminal.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

[Entire Configuration]

Figure 1:
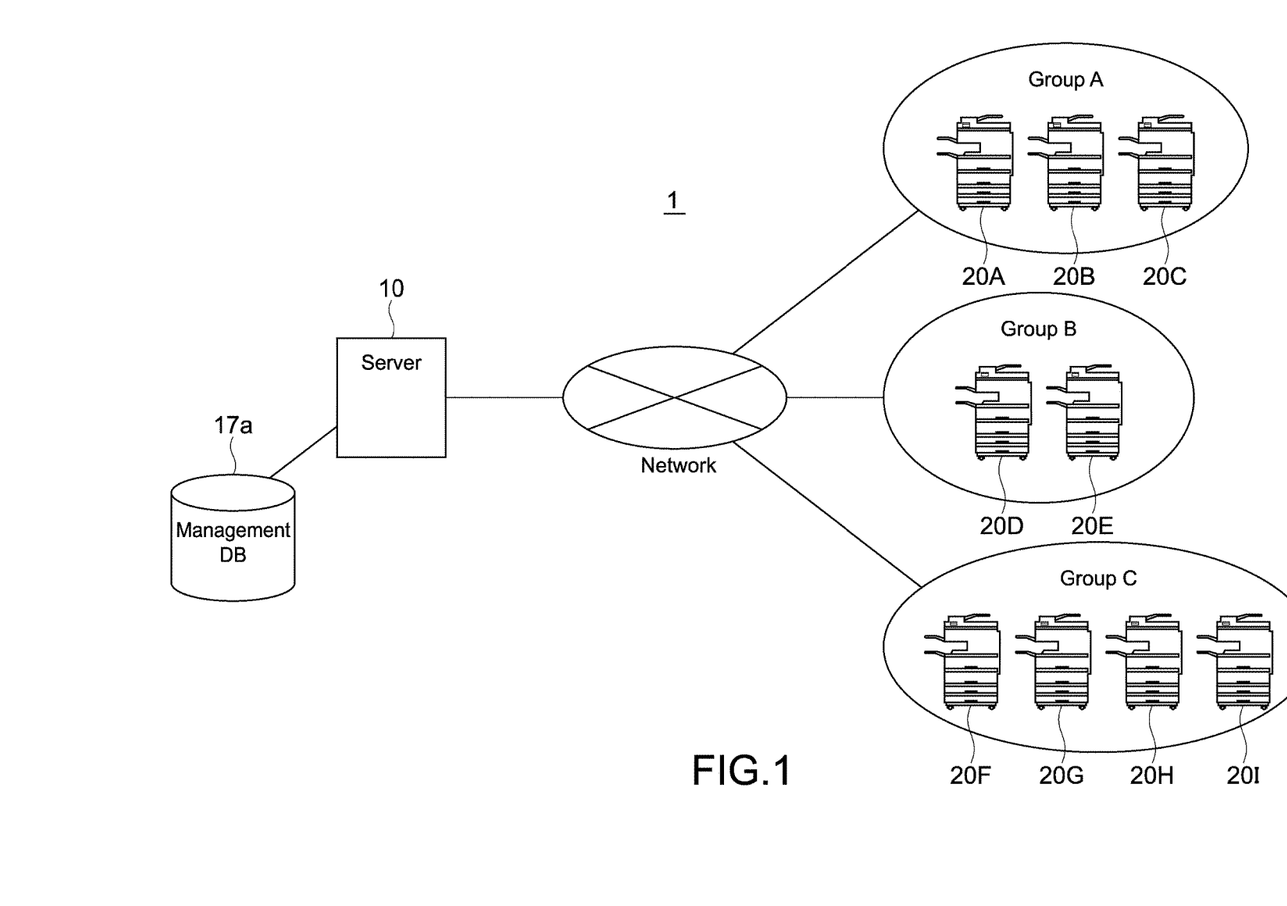
FIG. 1 shows a configuration of an entire remote maintenance system 1 according to an embodiment of the present disclosure.

First, a configuration of an entire remote maintenance system according to an embodiment of the present disclosure will be described. FIG. 1 shows a configuration of an entire remote maintenance system 1 according to an embodiment of the present disclosure.

The remote maintenance system 1 includes a server 10 and image forming apparatuses 20 connected via a network.

Note that when distinguishing the image forming apparatuses 20, the image forming apparatuses 20 are referred to as image forming apparatuses 20A, 20B, 20C, 20D, 20E, 20F, 20G, 20H, and 20I.

The server 10 divides the image forming apparatuses 20 into groups A, B, and C and manages them. These groups A, B, and C may each be, for example, a group for each customer, or a group of the image forming apparatuses 20 of one customer, which are installed on one floor.

The image forming apparatuses 20 each send information (print information) on print start, print end, the number of print pages, and the like, and event information on an error, a paper jam, and the like in the corresponding image forming apparatus itself, to the server 10 via the network. The server 10 stores these pieces of information in a management DB (Database) 17a of the server 10.

Therefore, the server 10 can know a time period during print processing and a busy time period for each image forming apparatus 20 under management and for each group of the image forming apparatuses 20.

The server 10 instructs a service person to perform on-site maintenance for a specific image forming apparatus 20. At this time, the server 10 notifies the service person of the usage status of the image forming apparatus 20 to be maintained or the usage status of the image forming apparatus 20 in the group to which the image forming apparatus 20 to be maintained belong.

Therefore, the service person can visit the customer to perform maintenance during a time period when the user is not using the image forming apparatus 20 or the image forming apparatus 20 is relatively free to use.

The configuration of the entire remote maintenance system 1 according to the present embodiment has been described heretofore.

[Configuration of Server]

Figure 2:
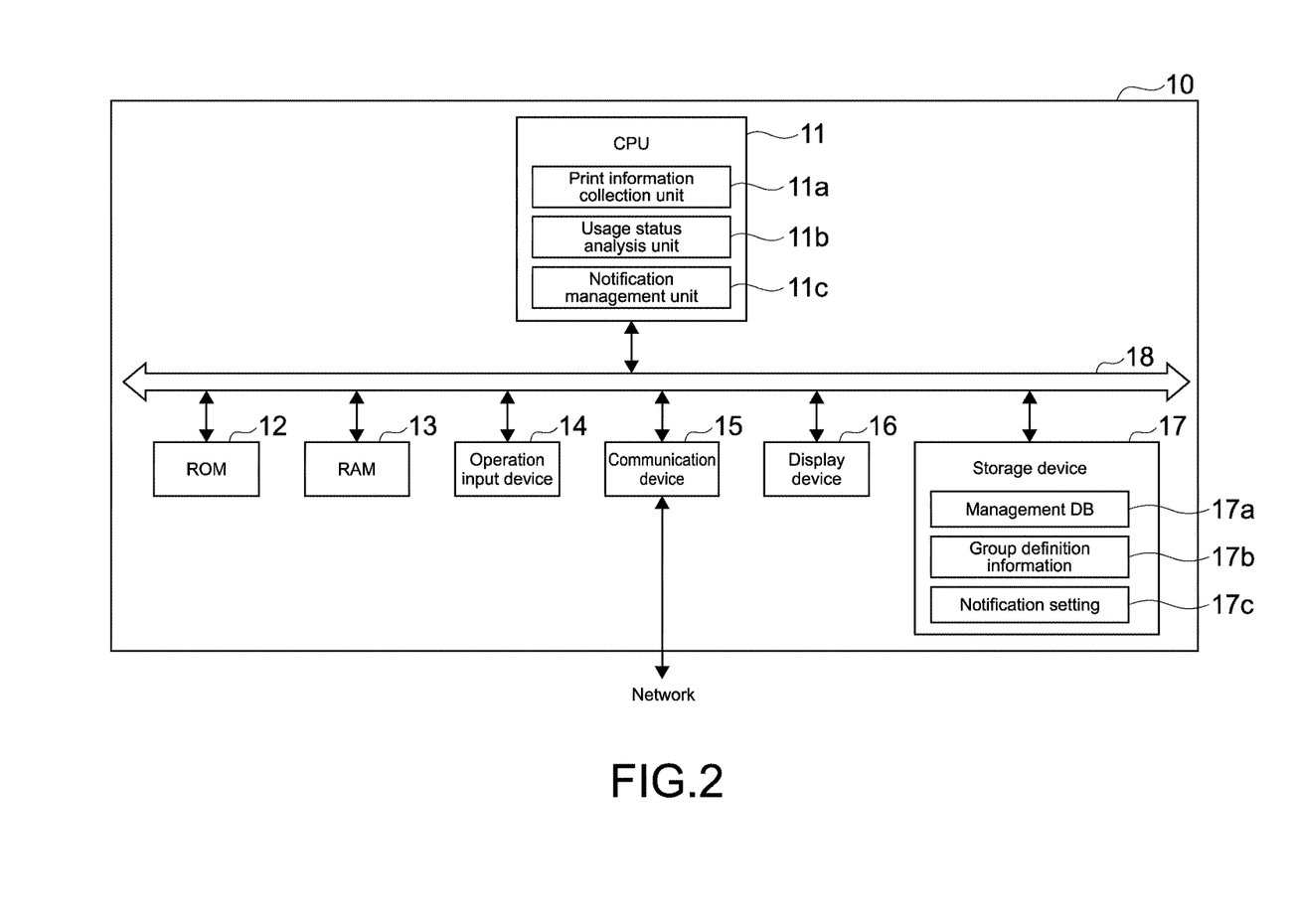
FIG. 2 shows a configuration of a server 10 that is a general-purpose computer.

Next, a configuration of the server 10 will be described. The server 10 may be constituted of dedicated hardware or software, or may be a general-purpose computer. FIG. 2 shows a configuration diagram in the case where the server 10 is a general-purpose computer.

As shown in FIG. 2, the server 10 includes a CPU (Central Processing Unit) 11, a ROM (Read Only Memory) 12, a RAM (Random Access Memory) 13, an operation input device 14, a communication device 15 (second communication device), a display device 16, and a storage device 17 (third memory), and these blocks are connected to each other via a bus 18.

The ROM 12 (second memory) fixedly stores a plurality of programs such as firmware for executing various types of processing, and data. The RAM 13 is used as a work area of the CPU 11 and temporarily stores an OS (Operating System), various applications being executed, and various types of data being processed.

The storage device 17 is, for example, an HDD (Hard Disk Drive), a flash memory, or other nonvolatile memories. The storage device 17 stores the management DB 17a, group definition information 17b, and notification setting 17c in addition to the OS, various applications, and various types of data.

The management DB 17a stores, for each image forming apparatus 20, print information collected from each image forming apparatus 20 under the management of the server 10 and information on an event (e.g., a paper jam and a system error) that occurs in each image forming apparatus 20.

In the group definition information 17b, which image forming apparatus 20 belongs to which group is defined.

In the notification setting 17c, for example, a destination of an e-mail of a service person for notifying the service person at the time of scheduled maintenance and failure is set.

The communication device 15 is connected to a network for sending/receiving information to/from the image forming apparatus 20 and a portable terminal of the service person.

Of the plurality of programs stored in the ROM 12 or the storage device 17, the CPU 11 loads a program in the RAM 13 in response to a command input via the operation input device 14, and appropriately controls the display device 16 and the storage device 17 according to the loaded program.

The operation input device 14 is, for example, a pointing device such as a mouse, a keyboard, a touch panel, or other operation devices.

The display device 16 is, for example, a liquid crystal display, an EL (Electro-Luminescence) display, or a plasma display.

Next, functional blocks will be described. When the CPU 11 (second processor) of the server 10 executes a program (second information processing program), the CPU 11 operates as the functional blocks described below.

The functional blocks that the CPU 11 (second processor) of the server 10 realizes include a print information collection unit 11a, a usage status analysis unit 11b, and s notification management unit 11c.

The print information collection unit 11a collects print information (including print start time, print end time, the number of printed sheets, and the like) from each image forming apparatus 20 under management, and stores the print information in the management DB 17a.

The usage status analysis unit 11b analyzes, by three methods to be described later, the usage status of the image forming apparatus 20 to be maintained and the usage status of the image forming apparatus 20 in the group including the image forming apparatus 20 to be maintained. Then, the usage status analysis unit 11b stores the analysis result in the management DB 17a.

The notification management unit 11c sends a notification to the destination acquired from the notification setting 17c in order to notify the service person by an e-mail or the like at the time of scheduled maintenance and failure of the image forming apparatus 20.

The configuration of the server 10 has been described heretofore.

[Configuration of Image Forming Apparatus]

Figure 3:
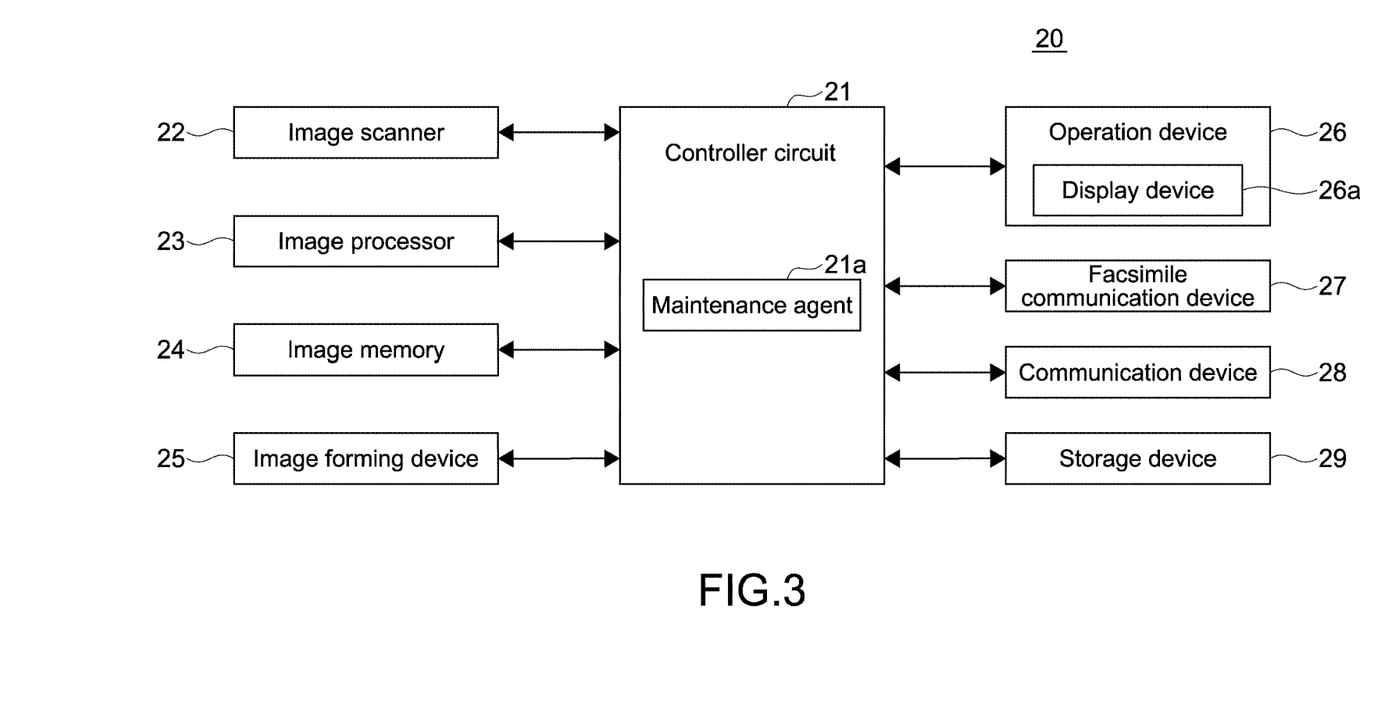
FIG. 3 schematically shows a configuration of an image forming apparatus 20.

Next, a configuration of the image forming apparatus 20 will be described. FIG. 3 is a configuration diagram schematically showing the configuration of the image forming apparatus 20.

The image forming apparatus 20 includes a controller circuit 21. The controller circuit 21 includes a CPU, a RAM, a ROM, dedicated hardware circuits, and the like and performs overall operational control of the image forming apparatus 20.

The controller circuit 21 is connected to an image scanner 22, an image processor 23, an image memory 24, an image forming device 25, an operation device 26, a display device 26a, a facsimile communication device 27, a communication device 28 (first communication device), a storage device 29, and the like. The controller circuit 21 performs operational control of the respective devices connected thereto and sends/receives signals and data to/from those devices.

According to job execution instructions input by a user via the operation device 26 or a personal computer (PC) connected to the network, the controller circuit 21 controls drive and processing of mechanisms requisite for executing operational control of functions such as a scanner function, a printing function, a copy function, and a facsimile sending/receiving function.

Further, the controller circuit 21 includes a maintenance agent 21a. The CPU (first processor) of the image forming apparatus 20 loads a program (first information processing program), which is stored in a ROM or the like (first memory), in a RAM and executes the program. When the CPU of the image forming apparatus 20 executes the program, the CPU operates as the maintenance agent 21a, which is a functional block.

The maintenance agent 21a collects print information in the image forming apparatus 20 itself and notifies the server 10 of the collected print information via the communication device 28.

Note that although the usage status of the image forming apparatus 20 is analyzed based on the print information to determine the time period when the user does not use the image forming apparatus 20, it does not necessarily need to use the usage status of the printing function and the use of the scanner function or the facsimile function by the user may be regarded as the use of the image forming apparatus 20.

The image scanner 22 reads an image from a script.

The image processor 23 carries out image processing as necessary on image data of an image read by the image scanner 22. For example, the image processor 23 corrects shading of an image read by the image scanner 22 and carries out other image processing to improve the quality of the image to be formed.

The image memory 24 includes an area that temporarily stores data of a script image read by the image scanner 22 or data to be printed by the image forming device 25.

The image forming device 25 forms an image of image data and the like read by the image scanner 22.

The operation device 26 includes a touch panel device and an operation key device that accept user's instructions on various operations and processing executable by the image forming apparatus 20. The touch panel device includes the display device 26a such as an LCD (Liquid Crystal Display) equipped with a touch panel.

The facsimile communication device 27 includes an encoding/decoding device, a modulation/demodulation device, and an NCU (Network Control Unit) (all of which are not shown) and transmits facsimiles using a public telephone network.

The communication device 28 is constituted of a communication module such as a LAN board and sends/receives various types of data to/from apparatuses (PC, etc.) such as the server 10 via a LAN connected to the communication device 28, and the like.

The storage device 29 stores a script image read by the image scanner 22, and the like. The storage device 29 is a large-volume storage device such as an HDD (Hard Disk Drive).

The configuration of the image forming apparatus 20 has been described heretofore.

[Method of Analyzing Usage Status (Part 1)]

Next, a method (first method of the three methods) in which the usage status analysis unit 11b of the server 10 analyzes the usage status of the image forming apparatus 20 will be described. Note that in the first analysis method, the usage status in each image forming apparatus is analyzed.

(1-1) First, one day is divided into units of 30 minutes, the rate of the time period during which printing is executed in each of the divided 30 minute units is calculated and stored.

For example, the rate such as 10% between 15:00 and 15:30 and 30% between 15:30 and 16:00 is calculated and stored.

(1-2) Next, the calculated rates of the printing execution time in each of the unit of 30 minutes are averaged over the last 30 days.

(1-3) Next, in the case where the average value in a unit of 30 minutes exceeds a predetermined threshold value (e.g., 20%) (first threshold value), it is determined that the time period of 30 minutes is a time period with high usage frequency by the user.

Note that a plurality of threshold values may be set. For example, three threshold values (10%, 20%, and 30%) are set, and it may be determined that the image forming apparatus 20 is used with low frequency in the case where the average value exceeds 10%, the image forming apparatus 20 is used with medium frequency in the case where the average value exceeds 20%, and the image forming apparatus 20 is used with high frequency in the case where the average value exceeds 30%.

The method (first method of the three methods) in which the usage status analysis unit 11b of the server 10 analyzes the usage status of the image forming apparatus 20 has been described heretofore.

[Method of Analyzing Usage Status (Part 2)]

Next, a method (second method of the three methods) in which the usage status analysis unit 11b of the server 10 analyzes the usage status of the image forming apparatus 20 will be described. Note that in the second analysis method, the usage status not in each image forming apparatus but in each group is analyzed.

(2-1) First, one day is divided in units of 30 minutes, the rate of the time period during which printing is executed in the group in each of the divided 30 minute units is calculated and stored.

For example, in the case where one image forming apparatus 20 is used for 30 minutes and another image forming apparatus 20 is used for 15 minutes in a group including three image forming apparatuses 20, the usage rate of the image forming apparatus 20 in that time period is 50%.

(2-2) Next, the calculated rates of the printing execution time in each of the units of 30 minutes are averaged over the last 30 days.

(2-3) Next, in the case where the average value in a unit of 30 minutes exceeds a predetermined threshold value (e.g., 10%) (second threshold value), it is determined that the time period of 30 minutes is a time period with high usage frequency by the user using the group including the image forming apparatus 20.

The method (second method of the three methods) in which the usage status analysis unit 11b of the server 10 analyzes the usage status of the image forming apparatus 20 has been described heretofore.

[Method of Analyzing Usage Status (Part 3)]

Next, a method (third method of the three methods) in which the usage status analysis unit 11b of the server 10 analyzes the usage status of the image forming apparatus 20 will be described. Note that in the third analysis method, when the usage frequency increases in one month is analyzed instead of determining the usage status for each time period in one day.

(3-1) Using the data for the last month, the date (e.g., 15th and 30th) when the rate of increase in the number of printed sheets based on the average value of the number of printed sheets in the group per day exceeds a threshold value (third threshold value) is selected and saved.

(3-2) The number of times the rate of increase in the number of printed sheets based on the average value of the number of printed sheets exceeds the threshold value (third threshold value) on the day selected in (3-1) over the last six months is checked. In the case where the exceeded number of times exceeds the threshold value (fourth threshold value), it is determined that the day is a day when printing is executed many times.

The method (third method of the three methods) in which the usage status analysis unit 11b of the server 10 analyzes the usage status of the image forming apparatus 20 has been described heretofore.

[Flow of Processing (Part 1)]

Figure 4:
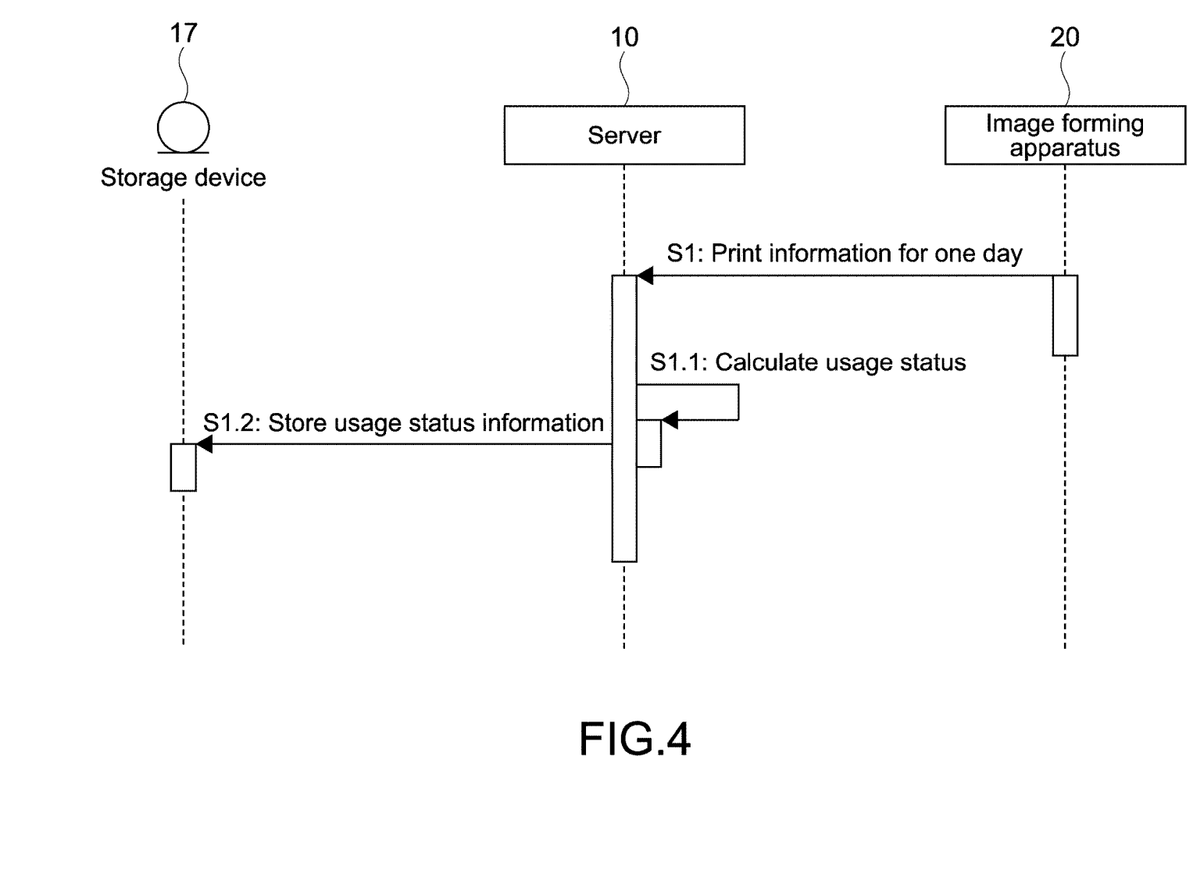
FIG. 4 illustrates a processing sequence periodically executed for collecting print information among flow of processing executed in the remote maintenance system 1.

Next, processing periodically executed in the remote maintenance system 1 for collecting print information among flow of processing executed in the remote maintenance system 1 will be described. FIG. 4 illustrates a sequence diagram for describing processing periodically executed in the remote maintenance system 1 for collecting print information among flow of processing executed in the remote maintenance system 1.

Note that in the following description, assumption is made that batch processing is executed in the remote maintenance system 1 once a day. Alternatively, processing of notifying print information may be executed in the remote maintenance system 1 each time print processing in the image forming apparatus 20 is completed.

First, the maintenance agent 21a of the image forming apparatus 20 notifies the server 10 of print information for one day, and the print information collection unit 11a of the server 10 collects print information from the image forming apparatus 20 (Step S1).

Next, the usage status analysis unit 11b of the server 10 analyzes the usage status of each image forming apparatus 20 and the usage status of the image forming apparatus 20 as a group by the above-mentioned three analysis methods based on the collected print information (Step S1.1).

Next, the usage status analysis unit 11b of the server 10 stores the analysis result in the management DB 17a of the storage device 17 (Step S1.2).

The processing periodically executed in the remote maintenance system 1 for collecting print information among flow of processing executed in the remote maintenance system 1 has been described heretofore.

[Flow or Processing (Part 2)]

Figure 5:
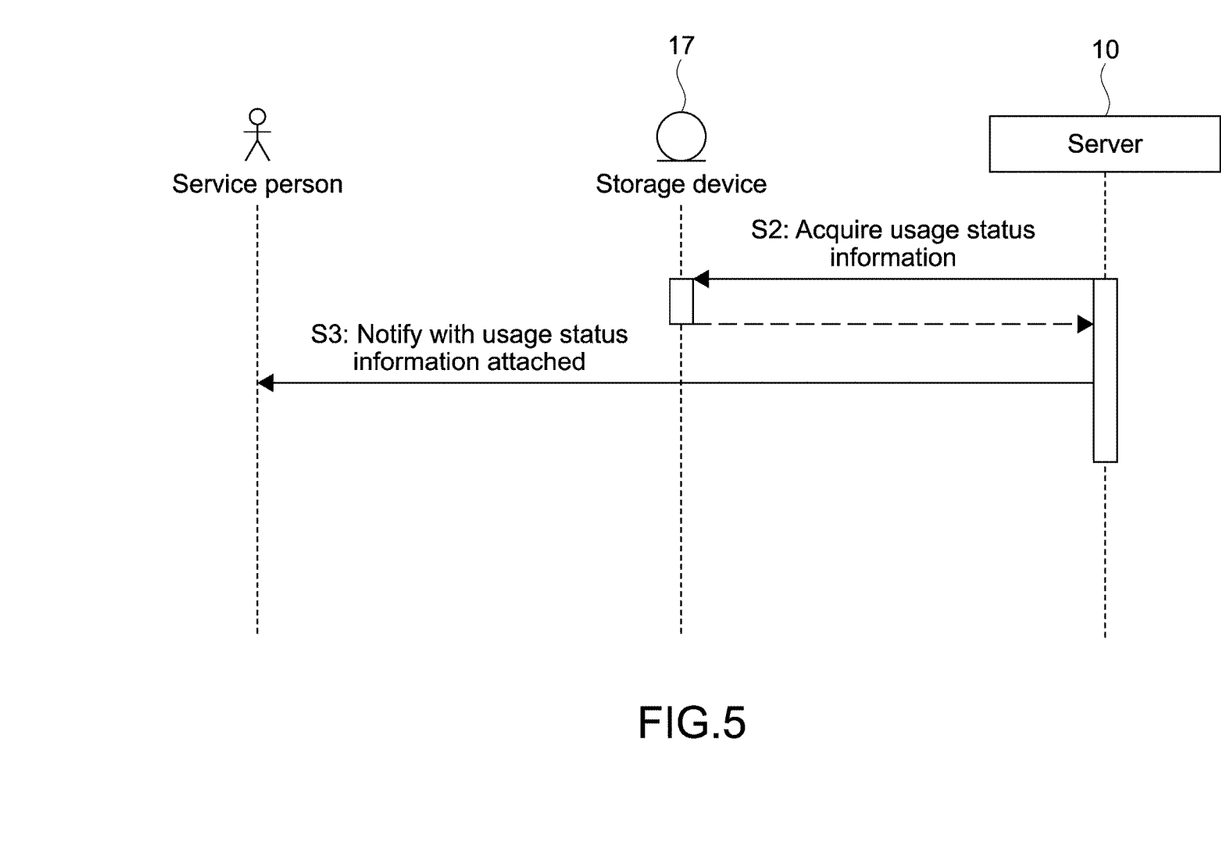
FIG. 5 illustrates a processing sequence executed when notifying a service person at the time of scheduled maintenance and failure of the image forming apparatus 20 of that fact among flow of processing executed in the remote maintenance system 1.

Next, processing executed when notifying a service person at the time of scheduled maintenance and failure of the image forming apparatus 20 of that fact among flow of processing executed in the remote maintenance system 1 will be described. FIG. 5 is a sequence diagram for describing processing executed when notifying a service person at the time of scheduled maintenance and failure of the image forming apparatus 20 of that fact among flow of processing executed in the remote maintenance system 1.

First, the notification management unit 11c of the server 10 acquires an analysis result of the usage status of the image forming apparatus 20 to be notified from the management DB 17a of the storage device 17 (Step S2).

Next, the notification management unit 11c of the server 10 sends a notification to the service person with the analysis result (usage status information) of the acquired usage status attached (Step S3).

Note that the service person who has received the notification determines the date and time of visiting the customer site, considering the three analysis results attached to the notification (the usage status of only the target image forming apparatus 20, the usage status of the group to which the target image forming apparatus 20 belongs, and information on the day when printing is executed many times).

The processing executed when notifying a service person at the time of scheduled maintenance and failure of the image forming apparatus 20 of that fact among flow of processing executed in the remote maintenance system 1 has been described heretofore.

[Supplementary Note]

As described above, the remote maintenance system 1 according to the present embodiment includes one or more image forming apparatuses 20; a server 10; and a terminal, in which the one or more image forming apparatuses 20 each include a first communication device 28 capable of communicating with the server 10 via a network, a first memory that stores a first information processing program, and a first processor that executes the first information processing program, when the first processor executes the first information processing program, the first processor notifies, when the image forming apparatus 20 itself executes printing, the server 10 of print information, the print information at least including print start time, print end time, and the number of printed sheets, the server 10 includes a second communication device 15 capable of communicating with the one or more image forming apparatuses 20 and the terminal via the network, a second memory that stores a second information processing program, a third memory that stores a management database 17a that stores the print information notified from the one or more image forming apparatuses 20, group definition information 17b, which image forming apparatus 20 belongs to which group being defined in the group definition information 17b, and notification setting 17c, a destination for sending a notification to the terminal being set in the notification setting 17c, and a second processor that executes the second information processing program, and when the second processor executes the second information processing program, the second processor stores, when being notified of the print information from each of the one or more image forming apparatuses 20, the notified print information in the management database 17a, analyzes a usage status of the one or more image forming apparatuses 20 based on the print information stored in the management database 17a, and stores the analysis result in the management database 17a, and acquires, from the management database 17a, the analysis result of the usage status of the image forming apparatus 20 to be maintained at the time of scheduled maintenance and failure of any of the one or more image forming apparatuses 20, attaches the acquired analysis result to the notification, and sends the notification to the terminal.

With this configuration, it is possible to make use of information on idle time when a user does not use the image forming apparatus even in on-site maintenance.

It should be understood by those skilled in the art that various modifications, combinations, sub-combinations and alterations may occur depending on design requirements and other factors insofar as they are within the scope of the appended claims or the equivalents thereof.

What is claimed is:

1. A remote maintenance system, comprising:
   one or more image forming apparatuses;
   a server; and
   a terminal, wherein
   the one or more image forming apparatuses each include
      a first communication device capable of communicating with the server via a network,
      a first memory that stores a first information processing program, and a first processor that executes the first information processing program, when the first processor executes the first information processing program, the first processor notifies, when one of the one or more image forming apparatuses itself executes printing, the server of print information, the print information at least including print start time, print end time, and the number of printed sheets, the server includes a second communication device capable of communicating with the one or more image forming apparatuses and the terminal via the network, a second memory that stores a second information processing program, a third memory that stores a management database that stores the print information notified from the one or more image forming apparatuses, group definition information, which one of the one or more image forming apparatuses belongs to which group being defined in the group definition information, and notification setting, a destination for sending a notification to the terminal being set in the notification setting, and a second processor that executes the second information processing program, and when the second processor executes the second information processing program, the second processor stores, when being notified of the print information from each of the one or more image forming apparatuses, the notified print information in the management database, analyzes a usage status of the one or more image forming apparatuses based on the print information stored in the management database, and stores the analysis result in the management database, and acquires, from the management database, the analysis result of the usage status of the one of the one or more image forming apparatuses to be maintained at the time of scheduled maintenance and failure of any of the one or more image forming apparatuses, attaches the acquired analysis result to the notification, and sends the notification to the terminal.

2. The remote maintenance system according to claim 1, wherein when the second processor executes the second information processing program, the second processor analyzes the usage status of the one or more image forming apparatuses by firstly, dividing one day into units of 30 minutes, and calculating a rate of a time period during which printing is executed in each of the divided 30 minute units, then averaging the calculated rates of the printing execution time in each of the units of 30 minutes over last 30 days, and then determining, where an average value in a unit of 30 minutes exceeds a predetermined first threshold value, that the time period of 30 minutes is a time period with high usage frequency by a user.

3. The remote maintenance system according to claim 1, wherein when the second processor executes the second information processing program, the second processor analyzes the usage status of the one or more image forming apparatuses by firstly, dividing one day into units of 30 minutes, and calculating a rate of a time period during which printing is executed in the group in each of the divided 30 minute units, then averaging the calculated rates of the printing execution time in each of the units of 30 minutes over last 30 days, and then determining, where the average value in a unit of 30 minutes exceeds a predetermined second threshold value, that the time period of 30 minutes is a time period with high usage frequency by a user using the one of the one or more image forming apparatuses in the group.

4. The remote maintenance system according to claim 1, wherein when the second processor executes the second information processing program, the second processor analyzes the usage status of the one or more image forming apparatuses by selecting, by using the print data for a last month, a date when a rate of increase in the number of printed sheets based on an average value of the number of printed sheets in the group per day exceeds a third threshold value, checking a number of times the rate of increase in the number of printed sheets based on the average value of the printed sheets exceeds the third threshold value on the selected day over last six months, and determining, where the exceeded number of times exceeds a fourth threshold value, that the selected day is a day when printing is executed many times.

* * * * *